US005647038A

United States Patent [19]
Minden et al.

[11] Patent Number: 5,647,038
[45] Date of Patent: Jul. 8, 1997

[54] NARROW BANDWIDTH BRAGG GRATING REFLECTOR FOR USE IN AN OPTICAL WAVEGUIDE

[75] Inventors: Monica L. Minden; Hans Bruesselbach, both of Calabasas, Calif.

[73] Assignee: Hughes Aircraft Company, Los Angeles, Calif.

[21] Appl. No.: 521,481

[22] Filed: Aug. 30, 1995

[51] Int. Cl.$^6$ .................................................. G02B 6/34
[52] U.S. Cl. ................................. 385/37; 372/6; 385/27
[58] Field of Search ............................... 372/6; 385/15, 385/27, 37, 39, 123–125, 129, 130

[56] References Cited

U.S. PATENT DOCUMENTS

| 3,795,447 | 3/1974 | Welch et al. | 356/28 |
|---|---|---|---|
| 4,057,321 | 11/1977 | Mahlein et al. | 385/130 X |
| 4,167,329 | 9/1979 | Jelalian et al. | 356/5.09 |
| 4,329,664 | 5/1982 | Javan | 359/276 |
| 4,856,893 | 8/1989 | Breen | 356/5.09 |
| 4,891,649 | 1/1990 | Labaar et al. | 342/203 |
| 4,900,119 | 2/1990 | Hill et al. | 385/27 |
| 5,131,069 | 7/1992 | Hall et al. | 385/642 |
| 5,187,760 | 2/1993 | Huber | 385/37 |
| 5,267,011 | 11/1993 | Callender | 356/5.09 |
| 5,305,335 | 4/1994 | Ball et al. | 372/6 |
| 5,317,576 | 5/1994 | Leonberger et al. | 372/6 |
| 5,488,620 | 1/1996 | Minden | 372/6 X |
| 5,511,083 | 4/1996 | D'Amato et al. | 372/6 |

FOREIGN PATENT DOCUMENTS

| 6-082554 | 3/1994 | Japan | 356/5.09 |

OTHER PUBLICATIONS

O'Shea, D. et al. *"Introduction to Lasers and Their Applications"* (1978) Addison–Wesley Publishing Company, pp. 120–123. [no month].

Takeuchi, N., et al., *"Random Modulation CW Lidar"* (May 1, 1983) Applied Optics, vol. 22, No. 9, pp. 1382–1386.

Lee, H.S., et al. *"Study of Pseudo Noise CW Diode Laser For Ranging Applications"* (1992) Proceedings of the SPIE: Cooperative Intelligent Robotics in Space 111, vol. 1829, pp. 36–45. [no month].

Keller, et al., *"Passively Mode–Locked Nd: YLF and Nd: YAG Lasers using a New Intracavity Antiresonant Semiconductor Fabry–Perot"* (1992) OSA Proceedings on Advanced Solid–State Lasers, vol. 13, pp. 98–100. [no month].

Hill et al., *"Bragg gratings fabricated in monomode photosensitive optical fiber by UV exposure through a phase mask"*, Applied Physics Letters, vol. 62, No. 10, Mar. 8, 1993, pp. 1035–1037.

G. Meltz et al., *"Formation of Bragg gratings in optical fibers by a transverse holographic method"*, Optics Letters, vol. 14, No. 15, Aug. 1989, pp. 823–825.

(List continued on next page.)

*Primary Examiner*—John D. Lee
*Attorney, Agent, or Firm*—V. D. Duraiswamy; W. K. Denson-Low

[57] ABSTRACT

A narrow bandwidth Bragg grating reflector comprises at least two Bragg reflection gratings positioned to form a Fabry-Perot etalon, with an optical gain medium between them. The etalon formed by the Bragg gratings has a reflection frequency spectrum that exhibits a plurality of primary peaks and nulls. The distance between the Bragg gratings is adjusted so that a predetermined design frequency falls within the bandwidth of one of the nulls, and the optical gain medium is chosen to provide optical gain for light at the design frequency. This establishes a secondary reflection peak in the Bragg grating etalon, centered on the design frequency, with a bandwidth that is narrower than those of the individual Bragg gratings and primary reflection peaks. In a preferred embodiment, the Bragg gratings are formed in the core of an optical fiber that is doped to provide optical gain at the predetermined optical frequency. A single-mode fiber laser is also provided in which one or more of its cavity reflectors is implemented with the present narrow bandwidth Bragg reflector.

13 Claims, 2 Drawing Sheets

OTHER PUBLICATIONS

G.A. Ball et al., "Design of a Single–Mode Linear–Cavity Erbium Fiber Laser Utilizing Bragg Reflectors", *Journal of Lightwave Technology*, vol. 10, No. 10, Oct. 1992, pp. 1338–1343.

Dana Z. Anderson et al., "Phase–Mask Method for Volume Manufacturing of Fiber Phase Gratings" *Proceedings of the Optical Fiber Conference*, Feb. 1993, paper PD16–1, pp. 68–70.

B.E.A. Saleh, et al., "Fundamentals of Photonics", *John Wiley & Sons, Inc.*, 1991, (no month) pp. 312–321.

NARROW BANDWIDTH BRAGG GRATING REFLECTOR FOR USE IN AN OPTICAL WAVEGUIDE

BACKGROUND OF THE INVENTION

1. Field of the Invention

This invention relates to Bragg grating reflectors, and more particularly narrow bandwidth Bragg grating reflectors for use in optical waveguides.

2. Description of the Related Art

The formation of Bragg reflection gratings in photosensitive optical fibers is described in Hill et al., "Bragg gratings fabricated in monomode photosensitive optical fiber by UV exposure through a phase mask," *Applied Physics Letters*, Vol. 62, No. 10, Mar. 8, 1993, pp. 1035–1037, and G. Meltz et al., "Formation of Bragg gratings in optical fibers by a transverse holographic method", *Optics Letters*, vol. 14, no. 15, August 1989, pages 823–825. Such gratings have been used to fabricate optical fiber lasers, such as the one described in G. A. Ball et al., "Design of a Single-Mode Linear-Cavity Erbium Fiber Laser Utilizing Bragg Reflectors," *Journal of Lightwave Technology*, Vol. 10, No. 10, October, 1992, pp. 1338–1343.

A Bragg grating will generally reflect light that falls within its frequency band, whose width (bandwidth) is inversely related to the length of the grating. Therefore, for devices that require Bragg reflectors with a very narrow frequency band, such as single-mode fiber lasers, the Bragg grating must be made relatively long.

There are currently two methods of fabricating Bragg gratings in optical fibers: (1) Two-beam interference method and (2) Phase mask method. In the two-beam interference method, described in the Meltz article cited above, a transverse process is used in which the Bragg grating is written in the core of the photosensitive fiber by exposing it to a two-beam interference pattern. The two interfering beams create light and dark interference fringes in the fiber core, which cause a corresponding variation in its refractive index. The length of the resulting Bragg grating is determined by the fiber core area that the two interfering beams illuminate, which in turn is limited by the diameter of the beams.

To write uniform gratings using the two-beam interference method, the two writing beams must consist of perfect plane waves (they must be perfectly collimated) with uniform intensities over the overlapping beam areas that are used to create the interference pattern in the fiber core. Any variations in the wavefront shape of the two beams will result in a "chirp" in the interference pattern, and a corresponding chirp in the Bragg grating. Variations in beam intensity also result in fiber grating chirp, because the varying UV exposure creates a background index change. As the diameters of the writing beams are increased, it becomes increasingly difficult to maintain uniform intensities and wavefronts.

In the phase mask method, described in Dana Z. Anderson et al., "Phase-Mask Method for Volume Manufacturing of Fiber Phase Gratings", *Proceedings of the Optical Fiber Conference*, February 1993, paper PD16-1, pages 68–70, a single optical beam is passed through a phase mask (a phase grating), which is usually designed to diffract the beam into only two of the many possible diffraction orders.. The fiber is positioned in close proximity to (but not in direct contact with) the phase mask. The diffracted orders, which have the same function as the writing beams in the two-beam interference method described above, interfere in the fiber core and produce an index grating with a period that is equal to the phase mask grating period.

With this method, the length of the resulting fiber grating is dependent on the diameter of the single optical beam that is passed through the phase mask. As discussed above, the spatial uniformity of an optical beam becomes increasingly difficult to control as its diameter increases. The uniformity of the fiber Bragg grating is also dependent on how uniform the phase mask's periodicity is over the area that is illuminated by the optical beam. Currently available phase masks exhibit acceptable uniformity over only 2–3 centimeters.

The above limitations place a limit on the length of the Bragg gratings that can be formed with either method (generally gratings can be made no longer than 2–3 centimeters), and therefore a limit on how narrow the grating's bandwidth can be made.

SUMMARY OF THE INVENTION

In view of the above problems, the present invention provides a narrow bandwidth Bragg grating reflector that can be formed using current Bragg grating formation techniques, and that has a bandwidth that is narrower than that exhibited by current Bragg reflectors.

This is accomplished by forming a Fabry-Perot etalon with at least two Bragg reflection gratings that have generally equal frequency bands, and positioning an optical gain medium between them. The etalon formed by the Bragg gratings has a reflection frequency spectrum (spectrum) that exhibits a plurality of primary peaks and nulls with respective spectral widths (bandwidths). The distance between the Bragg gratings is adjusted so that a predetermined design frequency falls within the bandwidth of one of the nulls in the etalon's spectrum, and the optical gain medium is chosen to provide optical gain for light at the design frequency. This establishes a secondary reflection peak in the Bragg grating etalon, centered on the design frequency, with a bandwidth that is narrower than those of the individual Bragg gratings and primary reflection peaks.

In a preferred embodiment, the Bragg gratings are formed in the core of an optical fiber that is doped to provide optical gain at the design frequency. A single-mode fiber laser is also provided in which one or more of its cavity reflectors is implemented with the present narrow bandwidth Bragg reflector.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 1c is a graph illustrating a reflection frequency spectrum for the Bragg grating reflector of FIG. 1a.

DETAILED DESCRIPTION OF THE INVENTION

Figure 1A:
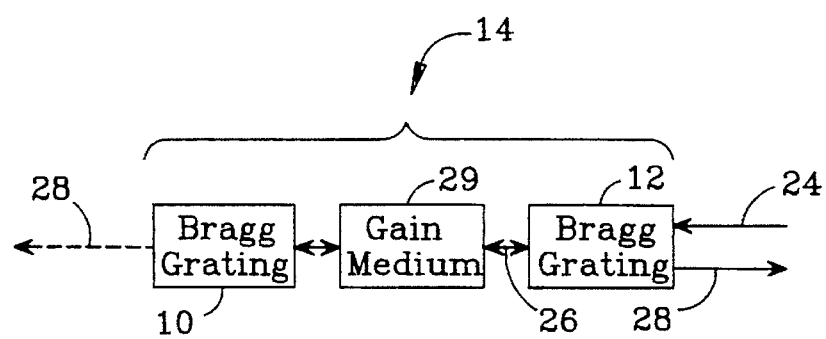
FIG. 1a is a block diagram illustrating the basic principles of the invention.
Figure 1B:
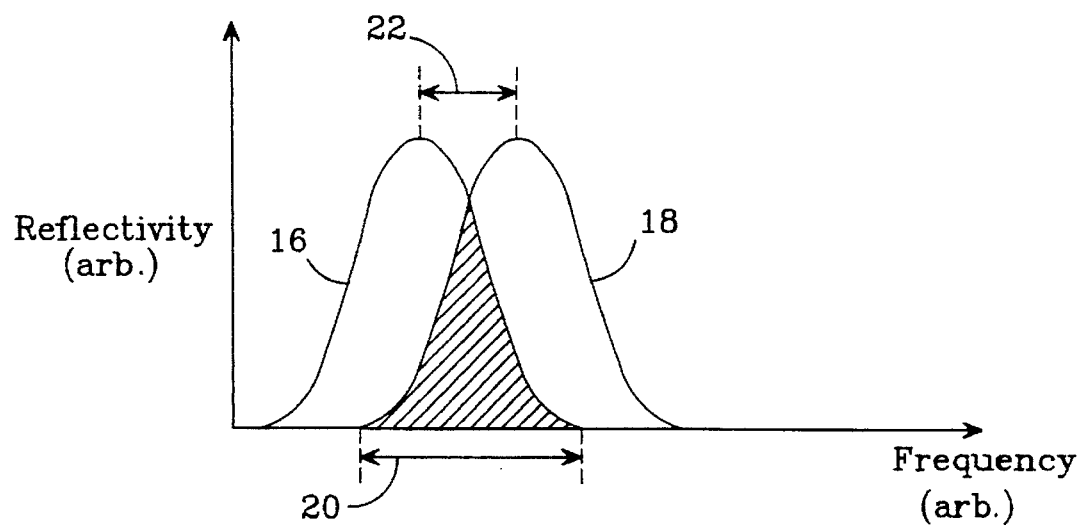
FIG. 1b is a graph illustrating the frequency bands of two Bragg gratings that may be used in the present invention.
Figure 1C:
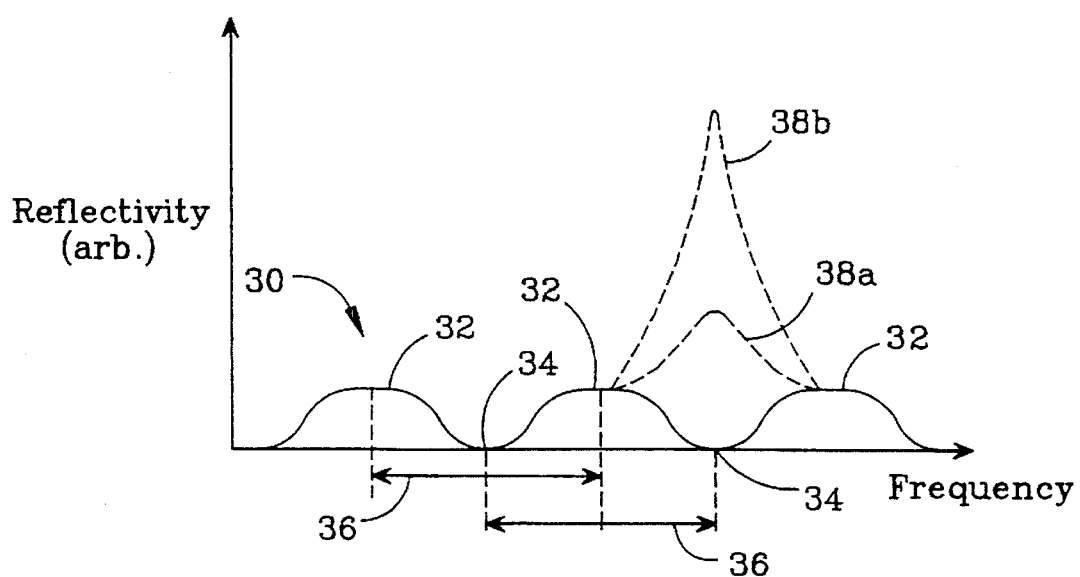

FIGS. 1a–1c illustrate the basic principles of the invention. In FIG. 1a, at least two Bragg reflection gratings 10 and 12 are positioned to form a Fabry-Perot etalon 14. Fabry-Perot etalons are well known in the art, and are described in B. E. A. Saleh, et al., "Fundamentals of Photonics,"*John Wiley & Sons*, 1991, pp. 312–321. Etalons are typically implemented with reflective mirrors that reflect light over identical frequency bands. When Bragg gratings 10 and 14 are used in place of conventional mirrors, their frequency bands must be similar enough to allow optical interference to take place between the beams that are reflected back and forth between the gratings. Therefore, the periodicities and lengths of Bragg gratings 10 and 12 must cause their respective frequency bands to at least partially overlap.

This is graphically illustrated in FIG. 1b, which shows frequency bands 16 and 18 for two Bragg gratings. When the bands at least partially overlap, there is a range of frequencies 20 over which both gratings will respond. In the preferred embodiment, the Bragg gratings are formed so that the distance 22 between the frequency bands' center frequencies is no greater than one-half the width of the narrowest of the frequency bands. The width of each frequency band is measured at its respective full-width half-maximum points.

Referring back to FIG. 1a, an optical gain medium 29, whose function will be explained below, is positioned between Bragg gratings 10 and 12. Incident light 24 is partially transmitted into the etalon 14 through one of the Bragg gratings 12, due to its partial transmittance. Portions 26 of the transmitted light are reflected back and forth between gratings 10 and 12 and through gain medium 29, and other portions 28 are coupled out through the opposite ends of the etalon 14 due to the partial transmittance of the gratings. In practice, one of the Bragg gratings 10 may be formed so that it has 100 percent reflectivity at the frequencies of interest, so that light at the design frequency is coupled in and out of the etalon through only one Bragg grating 12.

The optical interference that takes place in the etalon between the light portions 26 that reflect back and forth between the gratings 10 and 12, cause the etalon 14 to have a reflection spectrum (spectrum) that exhibits a plurality of primary peaks and nulls with respective bandwidths. The term reflection spectrum is used to refer to the range of frequencies that are "reflected" by the etalon 14 (the frequencies of the light portions 28 that are coupled out of the etalon 14).

FIG. 1c graphically illustrates the spectrum 30 of etalon 14, with its respective primary peaks 32 and nulls 34. The distance between the Bragg gratings determines the frequency differential 36 between the sequential peaks and sequential nulls of the resulting spectrum 30. Specifically, frequency differential 36 is approximately equal to $C/2nL_{gap}$, where C is the speed of light, $L_{gap}$ is the distance between the Bragg gratings and n is the refractive index. In practice, the present Bragg reflector will be used to reflect light at a predetermined center frequency (design frequency). The spacing between the Bragg gratings 10 and 12 is adjusted so that the design frequency falls within the bandwidth of one of the nulls 34 in the spectrum 30, preferably centered on a null 34.

The optical gain medium (29 in FIG. 1a) is chosen so that it provides optical gain for light at the design frequency. This establishes, in addition to the primary reflection peaks 32, a secondary reflection peak 38a and 38b in the etalon's spectrum that is centered on the design frequency, with a bandwidth that is narrower that those of the individual Bragg gratings 10 and 12. The secondary reflection peak gets higher and narrower as the amount of gain provided by the gain medium 29 at the design frequency goes up. Peaks 38a and 38b illustrate the amplitude and bandwidth of the secondary reflection peak when the amount of optical gain provided at the design frequency is equal to 60% and 90%, respectively, of the amount required to achieve lasing at the design frequency. In the preferred embodiment, the amount of optical gain provided at the design frequency is kept below that required to achieve lasing, but is high enough so that the amplitude of the secondary reflection peak is higher than that of the primary reflection peaks 32.

Figure 2:
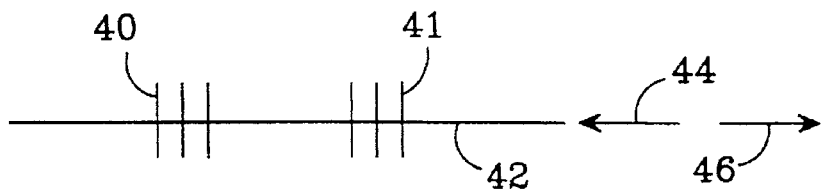
FIG. 2 is a schematic diagram of a preferred Bragg reflector embodiment.

The present Bragg reflector is particularly suitable for use in optical fibers, as illustrated in FIG. 2. The Bragg gratings 40 and 42 are preferably written in the core of a photosensitive optical fiber 42 using either the two-beam interference or Phase mask method described in the Ball et al. and Anderson at al. articles cited above. The fiber is suitably AT&T Corp. EDF-HC fiber, and the preferred dopant for making it photosensitive is germanium, which makes it sensitive to ultraviolet (UV) light. The fiber 42 is also doped to provide optical gain at the design wavelength. As an illustrative example, the fiber 42 may be doped with erbium to provide optical gain at a design wavelength of approximately 1.5 microns. The Bragg gratings 40 and 41 are preferably formed so that they have substantially the same length, and are formed under substantially equal UV exposure conditions (i.e. the same temperature, tension, exposure time, UV intensity, etc.) to ensure that their respective frequency bands overlap.

In operation, light 44 that is coupled into the fiber 42 reflects back and forth in the etalon created by gratings 40 and 41. As described above, the spacing between the gratings is adjusted so that the design wavelength falls within one of the nulls in the etalon's reflection spectrum. The doped fiber portion that lies between gratings 40 and 41 provides optical gain at the design wavelength. The bandwidth of the light 46 that is coupled out of the etalon and out of the fiber 42 is narrower than it would have been if a conventional Bragg grating reflector had been used.

Figure 3:
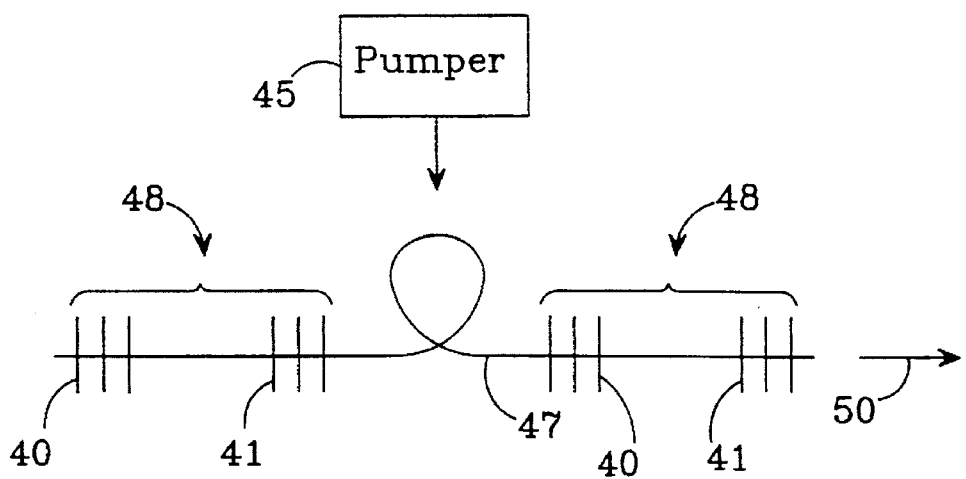
FIG. 3 is a schematic diagram of a single-mode fiber laser that incorporates the Bragg reflector of FIG. 3.

FIG. 3 illustrates how the present Bragg reflector may be used to fabricate a single-mode fiber laser that is optically or electrically pumped by a pumper 45. Optical fiber lasers with intra-cavity Bragg grating reflectors are generally known, and are described in G. A. Ball et al., "Design of a Single-Mode Linear-Cavity Erbium Fiber Laser Utilizing Bragg Reflectors," *Journal of Lightwave Technology*, Vol. 10, No. 10, October, 1992, pp. 1338–1343. One or more of the conventional reflectors used in the fiber 47 are replaced with the present Bragg reflectors 48 to achieve a laser output 50 with a narrower bandwidth than could be achieved with conventional Bragg grating reflectors.

Figure 4:
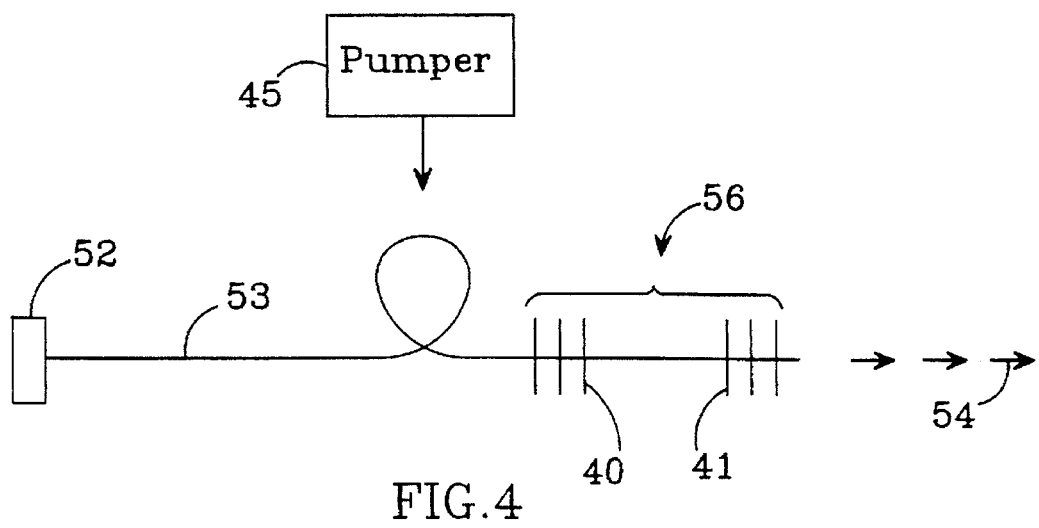
FIG. 4 is a schematic diagram of a single-mode, mode-locked pulsed fiber laser that incorporates the Bragg reflector of FIG. 2.

The present Bragg reflector may also be used in a mode-locked, pulsed fiber laser, such as the one described in copending U.S. patent application Ser. No. 08/369,050 filed on Jan. 5, 1995, issued as U.S. Pat. No. 5,488,620 on Jan. 30, 1996, entitled "PASSIVELY MODE LOCKED-LASER AND METHOD FOR GENERATING A PSEUDO RANDOM OPTICAL PULSE TRAIN" by Monica Minden, and assigned to Hughes Aircraft Company. In this laser, illustrated in FIG. 4, a nonlinear reflector 52 is optically coupled to the fiber 53, forms part of the optical cavity, and mode-locks the optical pulses 54 emitted by the laser. The temporal widths of the optical pulses 54 are inversely proportional to the gain bandwidth of the optical cavity, which is dependent on the bandwidth of the cavity reflectors. In some applications very short pulses are required, which makes the relatively wide bandwidth conventional Bragg gratings suitable as cavity reflectors. However, some applications require long single-mode pulses that cannot be provided by the conventional Bragg grating reflectors. For these applications, one or more of the present Bragg grating reflectors may be used in the optical cavity. In the laser of FIG. 4, the present Bragg grating reflector is used as an output coupler 56.

Numerous variations and alternate embodiments will occur to those skilled in the art without departing from the spirit and scope of the invention. Although the present Bragg reflector is particularly suitable for use in fiber lasers, it may also be used in other applications that require a narrow bandwidth optical reflector, such as optical filter applications. Such variations and alternate embodiments are contemplated, and can be made without departing from the spirit and scope of the appended claims.

We claim:

1. A reflector for reflecting incident light that falls within a narrow frequency band, comprising:
    at least two individual Bragg reflection gratings with generally equal frequency bands positioned to form a reflective etalon for incident light, with said etalon having a reflection frequency spectrum that exhibits a plurality of primary peaks and nulls with respective bandwidths, and
    an optical gain medium positioned between said gratings and configured to provide optical gain for portions of said incident light that include a frequency within one of said nulls, said optical gain medium establishing a secondary reflection peak in said etalon that is centered on said frequency, and that has a bandwidth that is narrower than those of said individual Bragg gratings and said primary reflection peaks, wherein said gain medium is configured so that the amount of optical gain said optical gain medium provides to said light portions is less than an amount required to achieve optical lasing at said frequency.

2. The reflector of claim 1, wherein the amount of optical gain provided to said light portions by said gain medium is between approximately 60 percent and 90 percent of the amount required to achieve optical lasing at said frequency.

3. The reflector of claim 1, wherein said optical gain medium comprises a doped optical fiber.

4. The reflector of claim 3, wherein said Bragg reflection gratings are positioned in a core of said optical fiber, each of said gratings having generally equal lengths and periodicities.

5. The reflector of claim 4, wherein the frequency bands of said gratings at least partially overlap.

6. A reflector for reflecting incident light that falls within a narrow frequency band, comprising:
    an optical fiber with a fiber core that is doped to provide optical gain for at least one predetermined optical frequency, and
    at least two individual Bragg reflection gratings with generally equal frequency bands in said fiber core, said gratings forming a reflective etalon for incident light with said etalon having a reflection frequency spectrum that exhibits a plurality of primary peaks and nulls with respective bandwidths,
    said gratings spaced from each other so that said predetermined frequency falls within the bandwidth of at least one of said nulls, and so that a portion of said fiber core that is between said gratings provides optical gain for portions of said incident light that include said predetermined frequency, thereby establishing a secondary reflection peak in said etalon that is centered on said predetermined frequency has a bandwidth that is narrower than those of the primary reflection peaks and individual Bragg gratings, and has an amplitude that is greater than those of the primary reflection peaks, wherein the amount of optical gain provided by said fiber core portion is less than an amount needed to achieve optical lasing within said fiber core portion at said at least one predetermined frequency.

7. The reflector of claim 6, wherein the amount of optical gain provided by said fiber core portion is between approximately 60 percent and 90 percent of the amount needed to achieve optical lasing at said at least one predetermined frequency.

8. The reflector of claim 6, wherein said at least two Bragg reflection gratings comprise a pair of Bragg reflection gratings whose respective frequency bands at least partially overlap.

9. A laser, comprising:
    a gain medium for providing optical gain over a predetermined frequency band, wherein said gain medium comprises an optical fiber with a fiber core that is doped to provide optical gain over said predetermined frequency band,
    at least two cavity reflectors optically coupled to said gain medium for forming an optical resonant cavity in said gain medium, and
    a pump for optically or electrically pumping said gain medium,
    wherein at least one of said cavity reflectors comprises at least two individual Bragg reflection gratings with generally equal frequency bands, said gratings forming a reflective etalon for incident light, with said etalon having a reflection frequency spectrum that exhibits a plurality of primary peaks and nulls with respective bandwidths, said gratings spaced from each other so that a predetermined frequency falls within the bandwidth of at least one of said nulls, and so that a portion of said fiber core that is between said gratings provides optical gain for portions of said incident light that include said predetermined frequency, thereby establishing a secondary reflection peak in said etalon that is centered on said predetermined frequency, has a bandwidth that is narrower than those of the primary reflection peaks and individual Bragg gratings, and has an amplitude that is greater than those of the primary reflection peaks, wherein the amount of optical gain provided by said fiber core portion is less than an amount needed to achieve optical lasing within said fiber core portion at said at least one predetermined frequency.

10. The laser of claim 9 wherein one of the cavity reflectors is a nonlinear reflector for mode-locking optical pulses emitted by the laser, and said at least one of said cavity reflectors comprising at least two individual Bragg gratings is positioned as an output coupler.

11. A method of fabricating a narrowband Bragg grating reflector, comprising:
    providing a photosensitive optical fiber having a fiber core, said fiber being doped to provide optical gain at a predetermined frequency;
    forming, in said fiber core, at least two Bragg gratings having substantially the same length under substantially equal UV exposure conditions to ensure that the respective frequency bands of said gratings overlap, said gratings forming a reflective etalon for incident light, with said etalon having a reflection frequency spectrum that exhibits a plurality of primary peaks and nulls with respective bandwidths, said gratings spaced from each other so that said predetermined frequency falls within the bandwidth of at least one of said nulls, and so that a portion of said fiber core that is between said gratings provides optical gain for portions of said incident light that include said predetermined frequency, thereby establishing a secondary reflection peak in said etalon that is centered on said predetermined frequency, has a bandwidth that is narrower than those of the primary reflection peaks and individual Bragg gratings, and has an amplitude that is greater than those of the primary reflection peaks, wherein the amount of optical gain provided by said fiber core portion is less than an amount needed to achieve optical lasing within said fiber core portion at said at least one predetermined frequency.

12. The method of claim 11, wherein the spacing between said gratings determines the frequency differential between the sequential peaks and the sequential nulls of the resulting frequency spectrum.

13. The method of claim 12, wherein the frequency differential is approximately equal to $C/2nL_{gap}$, where C is the speed of light, $L_{gap}$ is the distance between the Bragg gratings and n is the refractive index of the fiber.

* * * * *